United States Patent [19]

Beiley

[11] Patent Number: 4,705,302

[45] Date of Patent: Nov. 10, 1987

[54] TUBE FITTING

[75] Inventor: Mark J. Beiley, Lomita, Calif.

[73] Assignee: Teledyne Linair Engineering, Gardena, Calif.

[21] Appl. No.: 867,544

[22] Filed: May 28, 1986

[51] Int. Cl.$^4$ ............................................. F16L 11/12
[52] U.S. Cl. ...................................... 285/47; 285/94; 285/382.2; 174/94 R
[58] Field of Search ....................... 285/94, 382.2, 47; 174/94 R; 361/215

[56] References Cited

U.S. PATENT DOCUMENTS

| | | | |
|---|---|---|---|
| 3,675,949 | 7/1972 | Dawson | 285/382.2 X |
| 4,025,092 | 5/1977 | Wakefield | 285/94 |
| 4,061,367 | 12/1977 | Moebius | 285/382.2 |
| 4,482,174 | 11/1984 | Puri | 285/382.2 |

FOREIGN PATENT DOCUMENTS 2140117 11/1984 United Kingdom ................. 285/94

Primary Examiner—Dave W. Arola
Attorney, Agent, or Firm—Keith D. Beecher

[57] ABSTRACT

A fitting for joining a tube to another axially aligned tube, or to a T-joint, elbow joint, or the like, comprising a sleeve fitted over the end of the tube, and an annular tubular member forced over the sleeve in coaxial relationship with the sleeve and the tube to compress the sleeve around the end of the tube to provide a high-strength fluid-tight joint between the sleeve and the tube. The fitting and the tube are formed of electrically conductive material, and an insulating dry lubricant is interposed between the components of the fitting, and between the fitting and the tube. The fitting is especially constructed to provide conductive paths from the surface of the tube and from the surface of an inner component of the fitting to an outer component so as to avoid arcing across the lubricant layer in the event of a lightning strike, or the like.

6 Claims, 2 Drawing Figures

TUBE FITTING

BACKGROUND OF THE INVENTION

The fitting of the invention is particularly suited for use in the hydraulic system of an aircraft. It is usual for the tubes used in an aircraft's hydraulic system to pass through the fuel tanks, and for fittings to be used within the fuel tanks to join the tubes. It is essential that in the event of a lightning strike, or similar happening, the resultant electrical currents flowing along the tubes do not arc at the fittings, especially when the fittings are located within the fuel tanks. Also, when used in military aircraft, it is essential that any currents induced in the tubes should the aircraft pass through a nuclear bomb blast, for example, do not create arcing at any of the fittings.

The currents which flow through the tubes as a result of lightning strikes, or the like, are such that the fittings must be proof against arcing up to currents of the order of 45 kilo amperes. Also, such currents have been found to have the characteristics of high frequency currents to create the well-known phenomenon of "skin effect" whereby the currents are concentrated into the thin surface layer of the tubes, and it is necessary for such currents to find appropriate flow paths through the fitting which obviate any tendency for the currents to produce an arc across the dry lubricant areas which are usually provided within the fitting.

The fittings described above are preferably formed of a metal such as titanium which is lightweight, and yet exhibits high fatigue strength. However, titanium is subject to galling, and it has been found necessary to place dry lubricant between various components of the fitting, and between the fitting and the tube, so that any motion between the tube and the fitting, and between the components of the fitting will not produce fretting fatigue cracks.

An objective of the present invention is to provide a fitting of the type described above which is constructed to provide a conductive path for high currents due to lightning strikes, and the like, from the surface of the tube and through the fitting, in a manner to preclude any tendency for arcing to occur across the components separated by the dry lubricant.

DETAILED DESCRIPTION OF THE ILLUSTRATED EMBODIMENT

Figure 1:
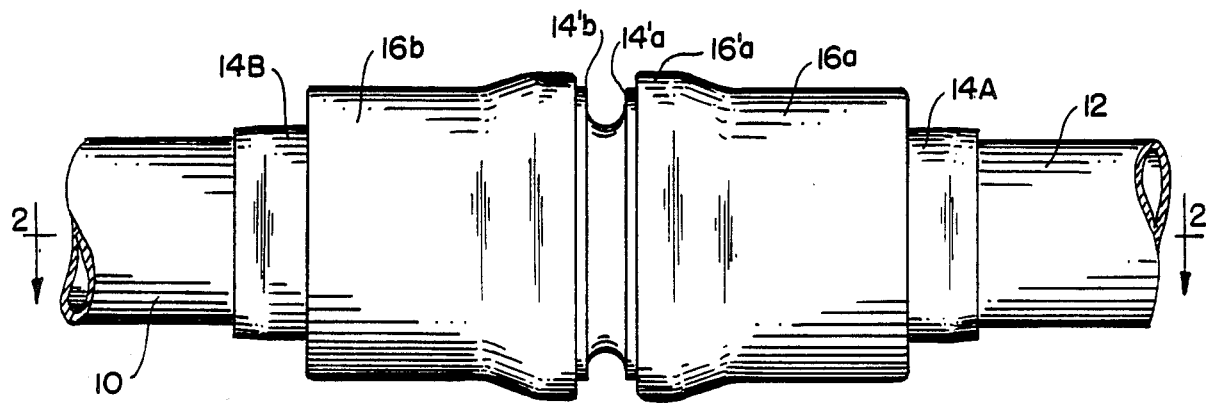
FIG. 1 is a side elevation showing the fitting of the invention being used to join two axially aligned tubes.
Figure 2:
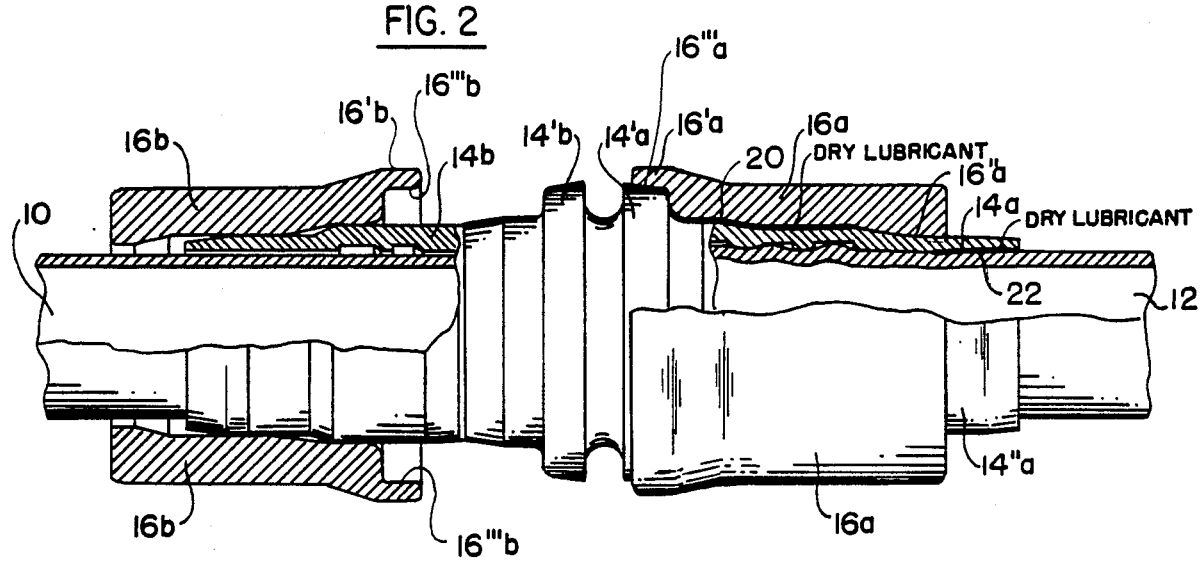
FIG. 2 is a section of the combination of FIG. 1, taken essentially along the line 2—2 of FIG. 1.

In the embodiment of FIGS. 1 and 2, the fitting of the invention is used to join two tubes 10 and 12 which are axially aligned with respect to one another. The fitting includes a sleeve having a first section 14a and a second section 14b which are mirror images of one another. The section 14a of the fitting includes an intermediate angled portion 14'a having an increased outer diameter with respect to the remaining portion of the sleeve, and having finite length. Sleeve section 14b includes a similar angled portion 14'b which is displaced axially from portion 14'a. The angled portions 14'a and 14'b form shoulders which permit a first annular tubular member 16a to be forced over section 14a, and which permit a second annular tubular member 16b to be forced over section 14b by appropriate tools. The fitting itself may be generally similar to the fittings described, for example, in U.S. Pat. Nos. 4,026,006; 3,893,720; 4,482,174 and 4,061,367.

As stated above, when such fittings are used in aircraft, it is usual for the components of the fittings to be formed of titanium, and to be used for providing joints in the titanium tubes of the hydraulic system of the aircraft. However, as also explained above, it has been found necessary to provide a dry lubricant, formed, for example, of molybdenum disulphide, between the components of the fitting and between the fitting and the tube so as to avoid fretting fatigue cracking due to relative movement between the components and between the fitting and the tube due to galling.

In the event of lightning strikes on the aircraft, it has been found that, unless appropriate modifications are made, that such lightning strikes create arcing within the fittings which can be disastrous, especially when the fittings are positioned within the fuel tanks.

This condition cannot be obviated merely by providing an electrically conductive path through any one of the components of the fitting because, as mentioned above, the electric currents resulting from lightning strikes, due to skin effect, are carried by the surfaces of the components. Accordingly, it is necessary to provide an electric path through the fittings from the surface of one component, through a second component, to the surfaces of the tubes.

This is achieved in accordance with the present invention by the construction shown particularly in FIG. 2. It should be noted in FIG. 2 that the right-hand section of the fitting is shown in assembled condition, whereas the left-hand section of the fitting is shown prior to the annular tubular member 16b being drawn up over the section 14b of the sleeve by an appropriate tool engaging the inner end of annular tubular member 16b and the outer shoulder formed by the increased diameter portion 14'b of the sleeve.

After the annular tubular member 16a has been forced into the position shown in FIG. 2, it has a forward end section 16'a which extends up and over the increased diameter angled portion section 14'a of the corresponding section 14a of the sleeve. The inner surface 16'''a of the section 16'a of the annular tubular member 16a is in intimate engagement with the outer surface of the increased diameter angled portion 14'a and in electrical contact therewith. The portions 14'a and 14'b are angled to insure intimate contact with mating surfaces 16'''a and 16'''b of the tubular member 16a and 16b.

A layer 20 of dry lubricant is interposed between an intermediate portion of the inner surface of the annular tubular member 16a and the outer surface of the section 14a of the sleeve, as shown.

The inner end of the annular tubular member 16a has an inner surface with a frusto-conical configuration of reducing diameter toward the rear end of the annular member 16a, this portion being designated 16''a. The inner surface of the portion 16''a of the tubular member 16a is in intimate contact with the outer surface of the sleeve 14a, and also forces the sleeve 14a against the tube 12 so that its corresponding inner surface is in intimate contact with the outer surface of the tube.

As also shown in FIG. 2, the annular tubular member 16a is forced over sleeve section 14a to be displaced from the inner end of the sleeve section to expose a portion 14″a of the sleeve. A second layer of dry lubricant designated 22 is interposed between the portion 14″a of the sleeve and tube 12.

With the illustrated configuration of the fitting, any tendency for relative movement between the tube and the fitting, and between the sleeve and the annular tubular member of the fitting does not tend to gall the material of the tube or of the fitting due to the layers of dry lubricant. Accordingly, there is no tendency for fretting fatigue cracking of the tubes or of the components of the fitting.

Should a lightning strike, or some other happening occur, so as to create high electrical currents along the tube 12, as mentioned above, such high currents flow around the outer surface of the tube due to skin effect. In the construction shown in FIGS. 1 and 2, the currents find a conductive path from the surface of the tube through the sleeve 14a to the rear of the annular tubular member 16a, and along the annular tubular member and across surface 16‴a to the increased diameter portion 14′a of the sleeve. The current then flows through similar paths through the left-hand portion of the fitting back to tube 12. During this current flow, there is no tendency for arcing to occur across the layers of dry lubricant, as was the case in the prior art fittings.

Exhaustive tests of the fitting shown in FIGS. 1 and 2 have revealed that it is immune to arcing for currents up to 45 kilo-amps, as compared with the arcing encountered in the prior art fittings when the currents arose to the level of around 10 kilo-amps.

The invention provides, therefore, an improved fitting which is particularly useful in aircraft, and which is constructed to be immune from the effects of lightning strikes and the like.

It will be appreciated that while a particular embodiment of the invention has been shown and described, modifications may be made. It is intended in the claims to cover all modifications which come within the spirit and scope of the invention.

I claim:

1. A fitting for an electrically conductive tube comprising: an electrically conductive sleeve extending over the end of the tube in coaxial relationship therewith; an annular electrically conductive tubular member positioned over said sleeve in coaxial relationship therewith for compressing the sleeve against the end of the tube to provide a high-strength fluid-tight joint between the sleeve and the tube, a portion of the inner surface of said tubular member at each end thereof being in intimate engagement with the outer surface of said sleeve and in electrical contact therewith; and a layer of dry lubricant of electically insulating material interposed between an intermediate portion of the inner surface of the outer tubular member and the outer surface of the sleeve.

2. The fitting defined in claim 1, in which said sleeve has a portion of increased diameter and finite length adjacent to the end of the tube, and in which the forward end of said tubular member extends up and over said increased diameter portion of said sleeve with its inner surface in intimate engagement and electrical contact with the oute surface of said increased portion of said sleeve.

3. The fitting defined in claim 1, in which the inner surface of the portion of said annular tubular member adjacent to the rear end thereof decreases in diameter toward said rear end, in which the tubular member is displaced forwardly from the rear end of said sleeve to expose a portion of the sleeve adjacent to said rear end, and which includes a layer of dry lubricant interposed between the inner surface of the rear end portion of the sleeve and the outer surface of the tube, and in which an intermediate portion of the inner surface of the sleeve adjacent to said rear portion thereof is engaged by the inner surface of said rear portion of said tubular member to force the inner surface of said intermediate portion of said sleeve into intimate engagement and electrical contact with the outer surface of the tube.

4. The fitting defined in claim 1, in which the tube, the sleeve, and the annular tubular member are all formed of titanium.

5. The fitting defined in claim 1, in which said dry lubricant is formed of molybdenum disulphide.

6. A fitting for an electrically conductive tube comprising an electrically conductive sleeve extending over the end of the tube in coaxial relationship therewith and having a portion of increased outer diameter and of finite length positioned at the end of the tube; an electrically conductive annular tubular member positioned over said sleeve in coaxial relationship therewith and displaced from the inner end of said sleeve to expose an inner end portion of said sleeve of finite length, said annular tubular member compressing an intermediate portion of said sleeve against the end of the tube to provide a high-strength fluid-tight joint between the sleeve and the tube, and the outer end of said annular tubular member extending up and over the increased diameter portion of said sleeve in intimate engagement and electrical contact therewith, the inner end portion of said tubular member having a frusto-conical inner surface of decreasing diameter towards said inner end intimately engaging the sleeve in electrical contact therewith and forcing the corresponding portion of said sleeve into intimate engagement with said tube in electrical contact therewith; and a layer of dry lubricant insulating material interposed between the sleeve and the portion of the annular tubular member between said increased diameter portion and said inner end portion, and a further layer of dry lubricant interposed between the tube and the inner end portion of said sleeve.

* * * * *